(12) United States Patent
Dubourg et al.

(10) Patent No.: US 12,554,035 B2
(45) Date of Patent: Feb. 17, 2026

(54) CORROSION EVALUATION OF NESTED CASINGS VIA PULSED EDDY CURRENT

(71) Applicant: Schlumberger Technology Corporation, Sugar Land, TX (US)

(72) Inventors: Isabelle Dubourg, Clamart (FR); Emmanuel Legendre, Clamart (FR); Fabrice Mege, Clamart (FR); Rina Baba, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 547 days.

(21) Appl. No.: 17/995,319

(22) PCT Filed: Apr. 6, 2021

(86) PCT No.: PCT/EP2021/058902
§ 371 (c)(1),
(2) Date: Oct. 3, 2022

(87) PCT Pub. No.: WO2021/198530
PCT Pub. Date: Oct. 7, 2021

(65) Prior Publication Data
US 2023/0161068 A1    May 25, 2023

(30) Foreign Application Priority Data
Apr. 3, 2020  (EP) .................................... 20315107

(51) Int. Cl.
*G01V 3/28*   (2006.01)
*E21B 47/00*  (2012.01)
(Continued)

(52) U.S. Cl.
CPC .............. *G01V 3/28* (2013.01); *E21B 47/006* (2020.05); *E21B 47/085* (2020.05); *E21B 47/00* (2013.01);
(Continued)

(58) Field of Classification Search
None
See application file for complete search history.

(56) References Cited

U.S. PATENT DOCUMENTS 4,965,521 A * 10/1990 Egloff .............. G01R 33/56518
324/318
5,452,761 A    9/1995 Beard et al.
(Continued)

FOREIGN PATENT DOCUMENTS

WO    2019168698 A1    9/2019

OTHER PUBLICATIONS

Second Substantive Exam issued in Saudi Arabia Patent Application No. 522440786 dated Nov. 9, 2023, 12 pages with English translation.
(Continued)

*Primary Examiner* — Arleen M Vazquez
*Assistant Examiner* — Leonard S Liang
(74) *Attorney, Agent, or Firm* — Jeffrey D. Frantz

(57) ABSTRACT

Methods and systems pertaining to a processing system and a downhole logging tool for investigating nested tubulars in a borehole. The downhole logging tool includes a transmitter coil for emitting a broadband excitation signal including one or more step excitations. The downhole logging tool also includes receiver coils including at least two receiver coils spaced apart from the transmitter coil at respective first and second distances from the transmitter, the first and second distances being distinct from each other, and each receiver coil being able to receive a response signal resulting from
(Continued)

the excitation signal. The downhole logging tool also includes an acquisition system for recording the excitation signal and the response signal of each receiver coil over time. The processing system derives information indicative of variations in individual thicknesses of the nested casing tubulars based on variations of the response signals over time.

20 Claims, 4 Drawing Sheets

(51) Int. Cl.
| | |
|---|---|
| *E21B 47/085* | (2012.01) |
| *E21B 47/002* | (2012.01) |
| *E21B 47/005* | (2012.01) |
| *E21B 47/007* | (2012.01) |
| *E21B 47/092* | (2012.01) |
| *G01B 7/06* | (2006.01) |
| *G01V 3/26* | (2006.01) |
| *G01V 3/38* | (2006.01) |

(52) U.S. Cl.
CPC ......... *E21B 47/0025* (2020.05); *E21B 47/005* (2020.05); *E21B 47/007* (2020.05); *E21B 47/092* (2020.05); *G01B 7/10* (2013.01); *G01V 3/26* (2013.01); *G01V 3/38* (2013.01)

(56) References Cited

U.S. PATENT DOCUMENTS

| | | | | |
|---|---|---|---|---|
| 5,770,943 | A * | 6/1998 | Zhou | G01R 33/56518 324/307 |
| 10,520,634 | B2 * | 12/2019 | Clay | E21B 47/09 |
| 11,976,546 | B2 * | 5/2024 | Fouda | E21B 47/0025 |
| 2002/0140425 | A1 | 10/2002 | Prammer et al. | |
| 2015/0338541 | A1 * | 11/2015 | Nichols | G01B 7/10 324/338 |
| 2016/0070018 | A1 * | 3/2016 | Nichols | G01V 3/28 324/339 |
| 2016/0103099 | A1 * | 4/2016 | Lott | G01N 27/904 324/242 |
| 2016/0245891 | A1 * | 8/2016 | Ookawa | G01R 33/56518 |
| 2017/0176629 | A1 * | 6/2017 | Omeragic | G01V 3/28 |
| 2017/0176630 | A1 | 6/2017 | David et al. | |
| 2018/0100950 | A1 * | 4/2018 | Yao | E21B 47/085 |
| 2018/0313207 | A1 * | 11/2018 | Khalaj Amineh | G01V 3/28 |
| 2019/0162870 | A1 | 5/2019 | San Martin et al. | |
| 2019/0218904 | A1 * | 7/2019 | Fouda | G01B 7/10 |
| 2020/0116807 | A1 * | 4/2020 | Hölscher | G01R 33/446 |
| 2020/0333500 | A1 * | 10/2020 | Fouda | E21B 47/006 |
| 2021/0285902 | A1 * | 9/2021 | Elsayed | G01V 3/32 |
| 2022/0178245 | A1 * | 6/2022 | Fouda | E21B 47/0025 |

OTHER PUBLICATIONS

Search Report and Written Opinion of International Patent Application No. PCT/EP2021/058902 dated Jun. 23, 2021, 13 pages.
International Preliminary Report on Patentability of International Patent Application No. PCT/EP2021/058902 dated Oct. 13, 2022, 10 pages.
Substantive Exam issued in Saudi Arabia Patent Application No. 522440786 dated Mar. 23, 2023, 19 pages.
Rejection Decision issued in Saudi Arabia Patent Application No. 522440786 dated Jun. 21, 2024, 10 pages with English translation.

* cited by examiner

CORROSION EVALUATION OF NESTED CASINGS VIA PULSED EDDY CURRENT

This application is a National Stage Entry of International Application No. PCT/EP2021/058902, filed Apr. 6, 2021, which claims priority to and the benefit of European Patent Application having Application No. EP 20315107.1, filed Apr. 3, 2020, which is incorporated by reference herein.

BACKGROUND OF THE DISCLOSURE

The present disclosure relates to systems and methods based on electromagnetic (EM) techniques for quantifying corrosion in multiple casing strings in oil and gas wells. Such systems may comprise an eddy current based tool, which may provide frequency-domain or time-domain measurements.

Such systems may include, for a frequency-domain system, a logging tool comprising an arrangement of a transmitter coil ("transmitter") and a set of receiver coils ("receivers") located at variable distances from the transmitter. The transmitter sends a current at a selected frequency into the formation that creates an alternating-current (AC) EM field in a permanent regime, which induces eddy current in the surrounding environment. An EM signal is induced by the eddy current in the receiver coils.

For a time-domain measurement, a square pulse signal is fed to the transmitter. Such signal also induces eddy current in the environment that, in turn, induces transient voltage signals which are measured by the receivers. For such measurement, the receivers are generally collocated with the transmitter.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a system that includes a downhole logging tool and a processing system. The downhole logging tool is for being lowered into a borehole having nested casing tubulars surrounding the logging tool in the borehole. The downhole logging tool includes a transmitter coil for emitting a broadband excitation signal including one or more step excitations. The downhole logging tool also includes receiver coils including at least two receiver coils spaced apart from the transmitter coil at respective first and second distances from the transmitter, the first and second distances being distinct from each other, and each receiver coil being able to receive a response signal resulting from the excitation signal. The downhole logging tool also includes an acquisition system for recording over time both the excitation signal emitted from the transmitter and the response signal of each receiver coil. The processing system derives information indicative of variations in individual thicknesses of the nested casing tubulars based on variations of the response signals over time.

The present disclosure also introduces a method that includes operating a downhole logging tool lowered into a borehole having nested casing tubulars surrounding the logging tool in the borehole. Operating the downhole logging tool includes emitting, via a transmitter coil of the downhole logging tool, a broadband excitation signal including one or more step excitations. Operating the downhole logging tool also includes recording, via an acquisition system of the downhole logging tool, the excitation signal and response signals of receiver coils of the downhole logging tool resulting from the excitation signal. The receiver coils include at least two receiver coils spaced apart from the transmitter coil at respective first and second distances from the transmitter. The first and second distances are distinct from each other. The method also includes operating a processing system to derive information indicative of variations in individual thicknesses of the nested casing tubulars based on variations of the response signals over time.

The present disclosure also introduces a method that includes acquiring an actual broadband excitation signal emitted by a transmitter of a transmitter-receiver system of a logging tool while the logging tool is disposed within a borehole extending into a subterranean formation. The method also includes acquiring a voltage response of a receiver of the transmitter-receiver system while the logging tool is disposed within the borehole. The acquired voltage response is induced by the actual excitation signal emitted by the transmitter. The method also includes determining a transfer function of the transmitter-receiver system based on a Fourier transform of the acquired voltage response, a Fourier transform of the acquired actual excitation signal, and perhaps a spectral density of a signal-to-noise ratio of the acquired voltage response. The method also includes estimating an ideal voltage response of the receiver to the ideal excitation signal as an inverse Fourier transform of the transfer function of the determined transmitter-receiver system and a Fourier transform of the ideal excitation signal.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
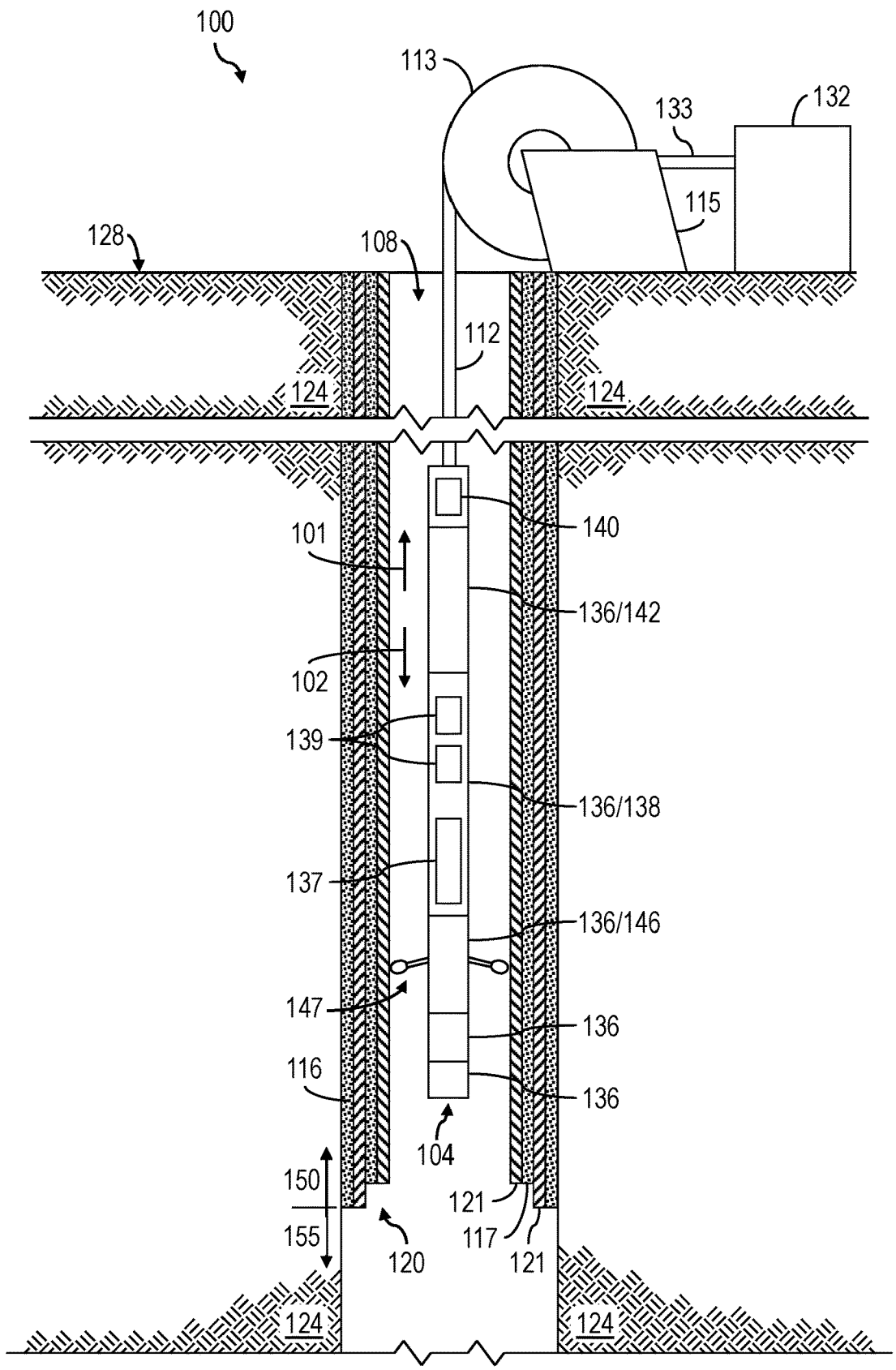
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting.

In addition, the present disclosure may repeat reference numerals and/or letters in the various examples. This repetition is for simplicity and clarity and does not in itself dictate a relationship between the various embodiments and/or configurations discussed.

FIG. 1 is a schematic view of at least a portion of an example implementation of a wellsite system 100 to which one or more aspects of the present disclosure may be applicable. The wellsite system 100 may be onshore (as depicted) or offshore. In the example wellsite system 100 shown in FIG. 1, a toolstring 104 is conveyed in a borehole 108 via a wireline, slickline, and/or other conveyance means 112. The example wellsite system 100 may be utilized for evaluation of the borehole 108, cement 116 securing casing 120 within at least a portion (150) of the borehole 108, a tubular (not shown) secured in the casing 120 (e.g., production services tubing), and/or a subterranean formation 124 penetrated by the borehole 108.

The example wellsite system 100 may be utilized in a cased section 150 of the borehole 108 and/or an open hole section 155 of the borehole 108. Although the majority of the wellbore 108 is depicted in FIG. 1 as being cased, a majority of the wellbore may be uncased ("open," without the casing 120 and cement 116). The example casing 120 depicted in FIG. 1 includes two nested casings 121 with an intervening layer of cement 117. Alternatively no intervening layer is interposed between the two nested casings 121. In this case, in an embodiment, one or more centralizers may be disposed at one or more predetermined depths between the two nested casings 121. However, one or more aspects of the present disclosure are also applicable to implementations (and/or portions of the borehole 108) in which the casing 120 comprises three or more nested casings 121, as well as when/where just a single casing 121 exists.

The toolstring 104 is suspended in the borehole 108 from the lower end of the conveyance means 112. The conveyance means 112 may be a single- or multi-conductor slickline or wireline logging cable spooled on a drum 113 of a winch 115 at the surface 128 of the wellsite from whence the borehole 108 extends. The wellsite surface 128 is the generally planar surface of the terrain (i.e., Earth's surface), a floor of a rig (not shown) at the wellsite, or other equipment at the wellsite, which is perpendicularly penetrated by the borehole 108. Operation of the winch 115 rotates the drum 113 to reel in the conveyance means 112 and thereby pull the toolstring 104 in an uphole direction 101 in the borehole 108, as well as to reel out the conveyance means 112 and thereby move the toolstring 104 in a downhole direction 102 in the borehole 108. The conveyance means 112 may include at least one or more conductors (not shown) that facilitate data communication between the toolstring 104 and surface equipment 132 disposed at the wellsite surface 128, including through one or more slip rings, cables, and/or other conductors (schematically depicted in FIG. 1 by reference number 133) electrically connecting the one or more conductors of the conveyance means 112 with the surface equipment 132. The conveyance means 112 may alternatively transport the tool string 104 without a conductor inside the cable but with at least one module that can autonomously acquire and/or process and/or store downhole measurements in downhole memory without human intervention or communication with the surface equipment 132.

Although not illustrated as such in FIG. 1, the winch 115 may be disposed on a service vehicle or a stationary skid/platform. The service vehicle or stationary skid/platform may also contain at least a portion of the surface equipment 132.

The toolstring 104 comprises a plurality of modules 136, one or more of which may comprise an elongated housing, mandrel, chassis, and/or structure carrying various electronic and/or mechanical components. For example, at least one of the modules 136 may be or comprise at least a portion of a device for measuring a feature and/or characteristic of the borehole 108, the casing 120, a tubular installed in the casing 120 (not shown), the cement 116, and/or the formation 124, and/or a device for obtaining sidewall or inline core and/or fluid (liquid and/or gas) samples from the borehole 108 and/or formation 124. Other implementations of the downhole toolstring 104 within the scope of the present disclosure may include additional or fewer components or modules 136 relative to the example implementation depicted in FIG. 1.

The wellsite system 100 also includes a data processing system that may include at least a portion of one or more of the surface equipment 132, control devices and/or other electrical and/or mechanical devices in one or more of the modules 136 of the toolstring 104 (such as a downhole controller 140), a remote computer system (not shown), communication equipment, and/or other equipment. The data processing system may include one or more computer systems or devices and/or may be a distributed computer system. For example, collected data or information may be stored, distributed, communicated to a human wellsite operator, and/or processed locally (downhole or at surface) and/or remotely.

The data processing system may, whether individually or in combination with other system components, perform the methods and/or processes described below, or portions thereof. For example, the data processing system may include processor capability for collecting caliper, acoustic, ultrasonic, and/or other data related to the evaluation of the cement 116, the casing 120, a tubular (not shown) installed in the casing 120, and/or the formation 124, according to one or more aspects of the present disclosure. Methods and/or processes within the scope of the present disclosure may be implemented by one or more computer programs that run in a processor located, for example, in one or more modules 136 of the toolstring 104 and/or the surface equipment 132. Such programs may utilize data received from the downhole controller 140 and/or other modules 136 and may transmit control signals to operative elements of the toolstring 104, where such communication may be via one or more electrical or optical conductors of the conveyance means 112. The programs may be stored on a tangible, non-transitory, computer-usable storage medium associated with the one or more processors of the downhole controller 140, other modules 136 of the toolstring 104, and/or the surface equipment 132, or may be stored on an external, tangible, non-transitory, computer-usable storage medium that is electronically coupled to such processor(s). The storage medium may be one or more known or future-developed storage media, such as a magnetic disk, an optically readable disk, flash memory, or a computer-readable device of another kind, including a remote storage device coupled over one or more wired and/or wireless communication links, among other examples.

As designated in FIG. 1 by reference number 138, at least one of the modules 136 may be or comprise a logging tool operable for acquiring EM measurements characterizing the borehole 108, the casing 120 (perhaps including each of the nested casings 121 individually), a tubular (not shown)

installed in the casing 120, either cement layer 116/117, and/or the formation 124. The logging tool 138 comprises at least one EM transmitter 137 and two or more EM receivers 139. Example implementations, operation, and utilization of the logging tool 138 within the scope of the present disclosure are described below.

As designated in FIG. 1 by reference number 142, another one (or more) of the modules 136 may be or comprise an orientation module. Such module 142 may include, for example, one or more of a relative bearing (RB) sensor, a gravity/acceleration sensor, a magnetometer, and a gyroscopic sensor, among other examples.

As designated in FIG. 1 by reference number 146, another one (or more) of the modules 136 may be or comprise a centralizer module. For example, the centralizer module 146 may comprise an electric motor driven by a controller (neither shown) and/or other means for actively extending ("opening") and retracting ("closing") a plurality of centralizing arms 147. Although just two centralizing arms 147 are depicted in the example implementation shown in FIG. 1, other implementations within the scope of the present disclosure may have more than two centralizing arms 147. Extension of the centralizing arms 147 aids in urging the downhole ultrasonic measurement tool 138 toward a central position within the casing 120, another tubular, or the borehole 108 being investigated by the logging tool 138. Implementations of toolstrings within the scope of the present disclosure may include more than one instance of the logging tool 138 and/or more than one instance of the centralizer module 146. The modules 136 may be conveyed in either or both of open-hole sections 150 and cased-hole sections 155, including implementations in which the centralizer module 146 and the logging tool 138 may be configured or configurable for use in either or both of the two sections. The toolstring 104 may also not comprise the centralizer module 146.

The conventional techniques utilized for corrosion evaluation in multiple casing strings are EM techniques that are eddy-current based. Such techniques may be frequency-domain or time-domain measurements. For example, for frequency-domain operating tools, a transmitter is fed with a properly selected, low-frequency current, such as in the range of 1-100 Hertz (Hz). This current induces magnetic field loops around the tool, which induce azimuthal eddy currents in the surrounding environment. The associated EM fields, namely the direct field from the transmitter together with the secondary field from eddy-currents induced in the surrounding conductive pipes, induce a voltage in a separate receiver. A mutual impedance, determined as the ratio of the receiver voltage over the transmitter current, is sensitive to the EM properties and the geometric parameters of the pipes. Depending on the distance between the transmitter and the receiver, the EM fields separate into three different regimes: near-field, transition zone, and remote-field. Depending on the number of pipes and their respective sizes, each or just some of the receivers are positioned in the remote-field region relative to the transmitter, such as at a distance of (or larger than) about 2.5 times the largest casing diameter, hence the name Remote Field Eddy Current (RFEC) frequently used for this technique. In this case, phase and attenuation measurements scale almost proportionally to the total metal thickness. This mutual impedance is complex valued with both amplitude and phase. In practice, the tool measures the phase as a phase shift, and measures the amplitude as an attenuation in decibels (dB). The phase shift and amplitude attenuation are referenced to air-calibration measurements of the tool, such as to corresponding values measured in the absence of metal pipes. Being in the RFEC zone, the measurement is sensitive to just the total metal thickness of the nested casing structure, such that identification of the contributions of the individual casings to the total thickness is impossible.

Time-domain operating tools use a Pulsed Eddy Current (PEC) technique that relies on the same physics as the RFEC technique and uses the same type of transducers. However, instead of measuring the magnetic coupling at selected discrete frequencies between a transmitter and several receivers located in the far field region, PEC utilizes a square pulse and one or more sensors, each sensor being both a transmitter and a receiver mounted on the same core. Conventional PEC-based logging tools include up to three such "transmitting-and-receiving" sensors having different lengths (e.g., each length in the range of about 2-50 centimeters (cm)). The length of each sensor is generally considered as being directly related to the depth of investigation of the measurement and, therefore, to the number of nested casings that can be assessed. In these tools, the various sensors are operated simultaneously. For each sensor, a square-pulse current or voltage excitation is used to generate the changing magnetic field. Consecutive to a step transition in the transmitter excitation, a transient voltage signal induced at the receiver is measured, thus providing information about the characteristics and geometry of the conductive material of the nested casings being tested. As with the conventional RFEC technique, in the presence of variations in characteristics of the nested casings (e.g., resulting from corrosion), the paths of the induced eddy currents will be affected, which in turn change the measured signal. The methods for interpreting these measurements are based on using variations of the receiver voltage waveform, with respect to a reference waveform acquired at a point selected from among the acquired measurement data, and arbitrarily considered as representative of a uniform (e.g., non-corroded) situation.

The PEC technique permits highlighting the time at which the measurement differences are visible. An early time is indicative of a variation of metal in the inner casing ( ) that have a smaller diameter while a late time is indicative of such variations in the outer casings that have a larger diameter. A positive signal variation indicates a slower decay compared to the reference waveform, which corresponds to an increase of metal thickness, whereas a negative signal variation indicates a decrease of metal thickness (e.g., metal loss). When thickness variations occur simultaneously on different ones of the nested casings, the conventional PEC methodology fails to correctly identify the individual casing thicknesses because the time signature on the waveforms of such variations overlap.

Thus, as described above, conventional frequency-domain tools primarily have sensitivity to total metal thickness, such that their ability to differentiate between individual pipes is very limited, whereas conventional time-domain tools rely on fragile and somewhat user-dependent, relative measurements. Accordingly, interpreting measurement data acquired with either type of tool can result in significant errors when assessing corrosion of individual ones of nested casings. One or more aspects introduced in the present disclosure can be utilized to reduce or eliminate such errors.

The systems introduced in the present disclosure pertain to a logging tool comprising a transmitter and a plurality of receivers, such as the example logging tool 138 shown in FIG. 1. Each transmitter or receiver is a magnetic coil comprising conductive windings, for instance made of copper wires, that may be wound around a magnetic core made of a material having a high magnetic permeability (such as ferrite or permalloy, for instance). Alternatively, the transmitter or receiver may not comprise a core, or may be wound around an electrically insulating material. The transmitters and/or receivers may be essentially cylindrical (with circular, rectangular, or otherwise-shaped cross-section) with a longitudinal axis corresponding to the tool axis. The conductive windings are able to transmit and/or receive EM signals when current passes through the windings and/or when the surrounding magnetic flux varies. Each coil may comprise several layers of windings superimposed. The transmitter and/or receiver coils may be substantially identical, or may be made of a different material or have a different architecture (in terms of number of turns or layers and/or type of cores).

FIGS. 2-5 are schematic views of portions of example implementations 201-204 of such a logging tool according to one or more aspects of the present disclosure. The logging tools 201-204 are examples of the logging tool 138 depicted in FIG. 1. Each logging tool 201-204 comprises a plurality of receivers located at increasing distances from a transmitter. For example, at least three distant receivers and/or the same number as the number of expected casings, such as five.

As indicated above, the remote field regime applies when the distance between the receiver and the transmitter is at a distance of about or greater than 2.5 times the casing diameter. The inventors have shown that, when the receiver is in the near field region for a given pipe, the received signal depends on the transmitter and/or receiver characteristics (such as length or shape) but also on the individual pipe contribution while, when the receiver is in the remote field region for a given pipe, it has a low dependency to the transmitter and/or receiver characteristics but is sensitive to a global contribution of the pipes, not to the individual contribution of each pipe. Therefore, having receivers at different distances from the transmitter permits facilitating separation of individual contributions of each pipe to the received signals, and also permits being able to give accurate information relative to each pipe, regardless of whether the pipes are concentric. Therefore, such configuration shall give information on the metal thickness of each pipe even when the pipe are not concentric. Indeed, a first receiver may be in the near field region regarding at least one casing (for example, the casing with the greatest diameter) while in the remote field region regarding at least another casing, for example two casings. A second receiver may be in the near field region regarding at least two casings (for example, the two casings with the greatest diameters) while in the remote field region regarding at least another casing, such as one casing. From the different responses analyzed together, the contribution of each pipe may be discriminated. Having a receiver in the remote field region to be able to have a reference signal that does not include a dependency on the transmitter and/or receiver characteristics is also part of an embodiment. In view of the casing sizes available in the oil and gas industry, i.e., the smallest casing having a diameter of about 11.5 centimeters (cm), a second smallest casing having a diameter of about 18 cm and the largest outside casing having a maximum outer casing diameter of about 64 cm, the receivers should be positioned in a certain range of distances from the transmitter (the transmitter-receiver distance is considered as being the edge-to-edge distance, i.e., the distance between the closest edges of the transmitter and the receiver). This range can be determined as follows: in an embodiment, the closest receiver may be configured at a distance less than 40 cm to lie in the near field for at least the second smallest pipe. In an embodiment, the furthest receiver may be configured at a maximum distance of about 152 cm to lie in the near field for the largest casing.

Figure 2:
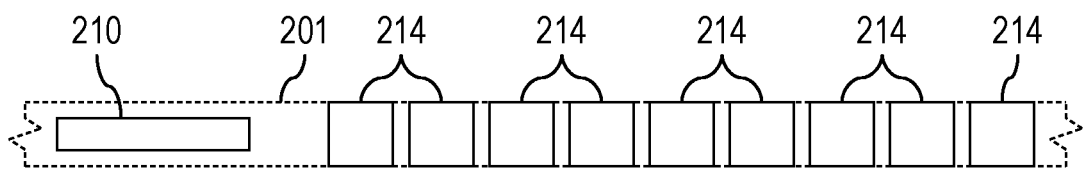
FIGS. 2-5 are schematic views of portions of example implementations of logging tools according to one or more aspects of the present disclosure.

In the example implementation depicted in FIG. 2, the logging tool 201 comprises nine receivers 214 spaced apart from a transmitter 210. The receivers 214 may be identical except for being located at increasing distances from the transmitter 210. However, as depicted by the example logging tool 202 shown in FIG. 3, the set of receivers may also include a receiver 218 collocated with the transmitter 214. For example, the transmitter 214 and the receiver 218 may be mounted around the same core (not shown). The example logging tool 203 depicted in FIG. 4 comprises receivers 214, 222, 226, 230 that increase in both size (axial length) and distance from the transmitter 210, which may be useful as the resolution of the signal decreases when distance between transmitter and receiver increases. Such implementations may also include the receiver 218 co-located with the receiver 210, as depicted in the example logging tool 204 shown in FIG. 5. In the example logging tools 201-204, as well as other implementations within the scope of the present disclosure, the axial lengths of each of the receivers 214, 218, 222, 226, 230 may be in the range of about 2-38 cm. However, the actual receiver sizes may be dictated by signal level considerations.

With respect to the transmitter-receiver systems 201-204 shown in FIGS. 2-5, as well as other examples within the scope of the present disclosure, the response of the receivers 214, 218, 222, 226, 230 to an excitation signal comprising at least one step excitation emitted by the transmitter 210 can be modelled using finite-element methods. A step excitation is an excitation signal rapidly changing in amplitude from a baseline value to a higher or lower value. In the following, it has been considered that the transmitter emits a single step excitation, but the transmitter may transmit a sequence of a plurality of step excitations, identical to each other or having different shapes, amplitudes, or signs. The response of each receiver to a step excitation signal of the transmitter can be expressed as a series of relaxation times related to the diffusion of magnetic fields in a sample. Having a greater depth of penetration, the lower frequencies contained in the excitation signal contribute to longer relaxations times. For nested casings, the longer relaxations times can provide information about material characteristics and geometry of the second, third, fourth, or even fifth casing.

Figure 3:
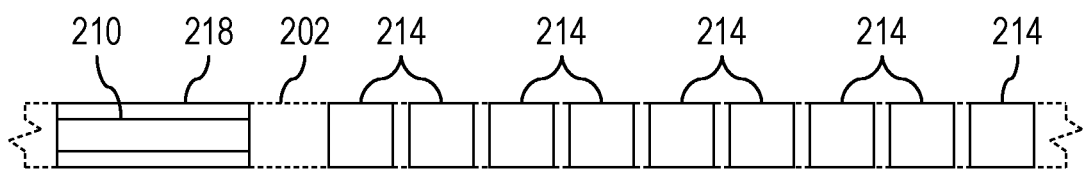
Figure 4:
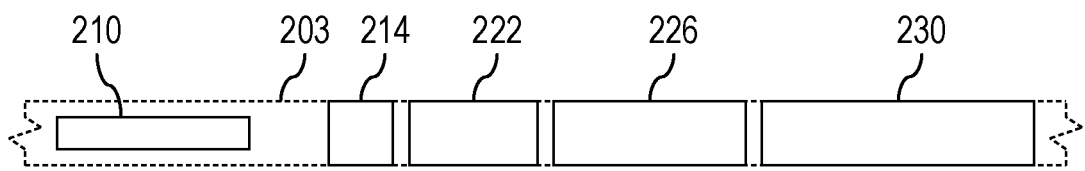
Figure 5:
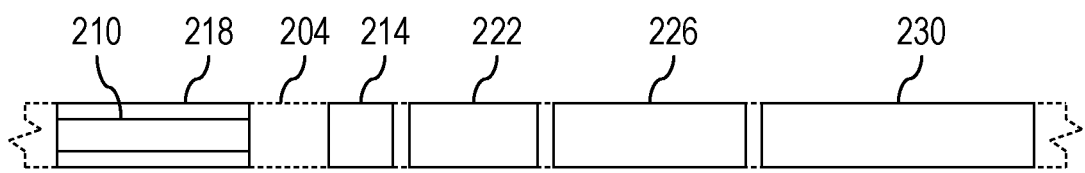
Figure 6:
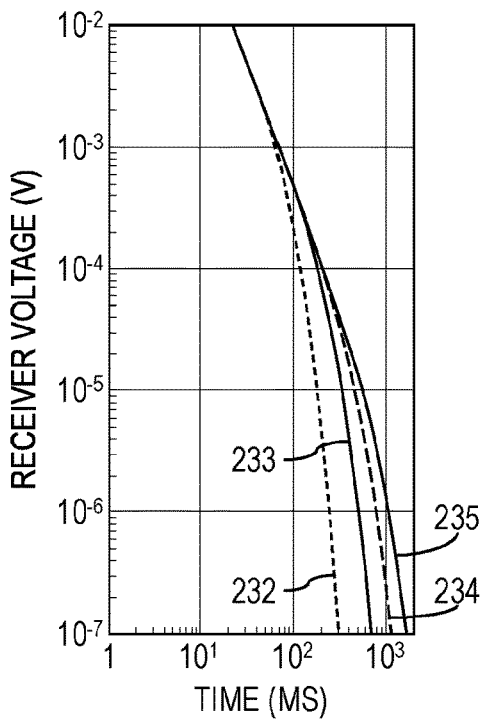
FIGS. 6-8 are graphs depicting one or more aspects of the present disclosure.
Figure 7:
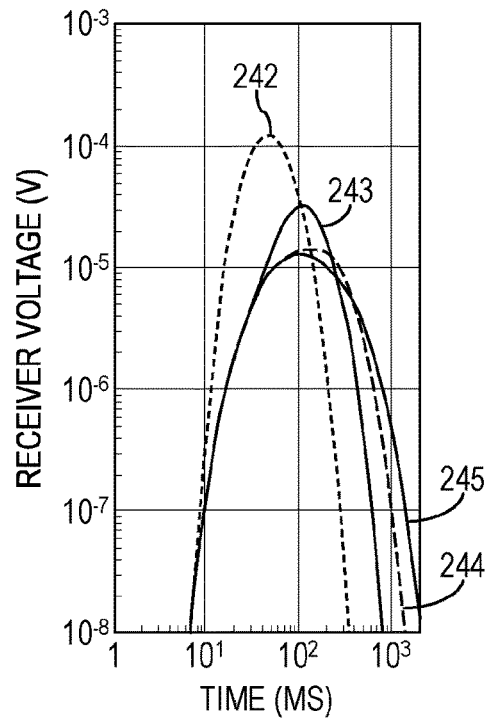
Figure 8:
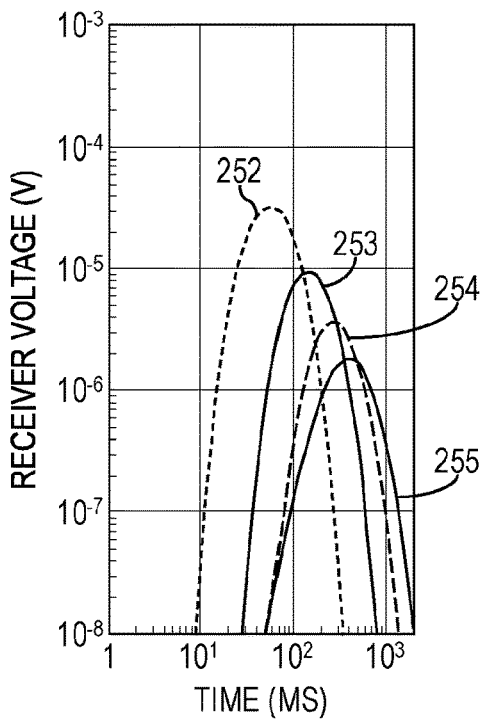

For example, FIGS. 6-8 depict computed transient voltages for three receivers, where FIG. 6 corresponds to a receiver 218 that is co-located with the transmitter 210 (as depicted in FIGS. 3 and 5), FIG. 7 corresponds to another receiver axially offset from the transmitter 210 (such as the receiver 222 depicted in FIGS. 4 and 5), and FIG. 8 corresponds to yet another receiver further axially offset from the transmitter (such as the receiver 230 depicted in FIGS. 4 and 5). FIGS. 6-8 depict the corresponding transient voltage responses of the receivers where the transmitter-receiver system of the logging tool is operated within nested casings, where the responses 232, 242, 252 depict two nested casings, the responses 233, 243, 253 depict three nested casings, the responses 234, 244, 254 depict four nested casings, and the responses 235, 245, 255 depict five nested casings. The responses to the increased presence of metal around the transmitter-receiver pairs appears in FIGS. 6-8 as an increased level of signal at longer times after the excitation has stepped down.

The co-located receiver voltage response appears in FIG. 6 as a voltage drop over the entire time range, where just the later times show sensitivity to the presence of an increased number of casings. The offset receiver signals in FIGS. 7 and 8 more clearly illustrate the diffusion process into the ferromagnetic material of the casings, with peak-shaped responses showing sensitivity to the presence of casings at earlier times compared to the co-located receiver. For a single offset receiver, both the shape of the response and the location of the maximum of the peak vary with the number of casings together with their respective properties. Also, an increased sensitivity to the outer casings is observed when increasing the transmitter-receiver offset distance.

FIGS. 6-8 demonstrate that attributes can be extracted from waveforms acquired by several receivers, where each receiver has a different sensitivity to the different casings. For example, the shorter spacings contain a stronger contribution of casings with smaller diameters, whereas the longer spacings contain a stronger contribution of casings with larger diameters. The joint interpretation of those waveforms permits the assessment of individual casing thicknesses.

The canonical implementation of PEC devices assumes a perfect square wave of current flowing through the transmitter. This square wave is the excitation of transmitter current that will induce the largest voltage on the receivers and will provide the most information at short times (or equivalently high frequencies). However, practical implementations of such current shape are very challenging, as well as accounting for the limited bandwidth of the system. A more realistic representation of transmitter current shape is an exponential decay with a characteristic time depending on the electrical characteristics of the transmitter and the resistive loss of the driving electronics. These quantities vary from tool to tool, such as due to manufacturing variabilities, and also during the operation of individual tools due to uncontrolled temperature variations.

For an ideal step excitation (i.e., the variation between baseline and higher or lower value being instantaneous), the ideal voltage waveform that could be measured can be represented as a weighted sum of exponents, such as in the example set forth below in Equation (1).

$$y(t) = \sum_{m=1}^{N} w_m e^{\alpha_m \cdot t} \quad (1)$$

where y(t) is voltage relative to time t induced in a given receiver, m is an index referring to each individual exponential component, N is the number of individual exponential components, $w_m$ is the weighting of the $m^{th}$ exponential component, and $\alpha_m$ is the decay rate of the $m^{th}$ exponential component.

However, in practice, the actual stepsignal emitted by the transmitter is seldom a perfect step function. Instead, the actual signal may be more accurately described by an exponential decay function, such as may have a shape described by Equation (2A) set forth below. Alternatively, the exponential decay function may be a sum of a plurality of exponential decay terms with different coefficients, such as described by Equation (2B) set forth below.

$$x(t) = A \cdot e^{\beta \cdot t} \text{ with } \beta < 0 \text{ and } t > 0 \quad (2A)$$

$$x(t) = \sum_{i=1}^{N} A_i e^{\beta_i \cdot t} \text{ with } \beta_i < 0, i \geq 1, \text{ and } t > 0 \quad (2B)$$

where x(t) is the decaying transmitter signal relative to time t, A (respectively $A_i$) is the amplitude of the transmitter current (or a component of the transmitter current signal), and β (respectively $β_i$) is the decay rate of the transmitter signal (or a component of the transmitter signal).

The impact of the transmitter current decay will result in a receiver's response voltage as set forth below in the example of Equation (3). Equation (3) and following are shown based on the signal described in Equation (2A) as an input, but similar operations may be based on the signal as described in Equation (2B).

$$\tilde{y}(t) = B(\overline{w}, \overline{\alpha}) \cdot e^{\beta \cdot t} + \sum_{m=1}^{N} w_m \cdot \frac{\beta}{\beta - \alpha_m} \cdot e^{\alpha_m \cdot t} \quad (3)$$

where $\tilde{y}(t)$ is the voltage measured by the receiver, $\overline{w}$ is the vector of the collective weights of the ideal voltage, $\overline{\alpha}$ is the vector of the collective decay rates of the ideal voltage, and B is the amplitude of the exponential decay of the decay rate β that is a function of just $\overline{w}$ and $\overline{\alpha}$.

Thus, the impact of the exponential decay will be twofold. First, the exponential decay adds a signal decaying with the same slope as the excitation. Second, the exponential decay transforms the weights of each of the ideal decay rates.

A simplistic removal of the exponential component that has the transmitter decay is not sufficient. Indeed, the rest of the signal is deformed with a stronger effect on rapidly decaying components. The present disclosure introduces recording the transmitting current x(t) and the induced receiver voltage $\tilde{y}(t)$, then estimating the ideal response y(t) that the system would have measured for an ideal step excitation u(t). Notating the direct Fourier transform by $\mathcal{F}[\bullet]$ and the ideal step excitation by u(t), the processing can be expressed as set forth below in Equations (4) and (5).

$$H(f) = \frac{\mathcal{F}[\tilde{y}](f)}{\mathcal{F}[x](f)} \quad (4)$$

$$y(t) = \mathcal{F}^{-1}[H(f) \cdot \mathcal{F}[u](f)](t) \quad (5)$$

where H(f) is the transfer function of the system, (f) is the frequency, and u is the ideal step function. Here, the transfer function is obtained and used to compute a response to an ideal step excitation. However, a transfer function as the one described above may be computed even when response to ideal step excitation is not estimated.

A Wiener regularization (among other examples of regularization functions) can be used to minimize the mean square error of this estimator by inserting a term involving an assumed spectral density S(f) of the signal-to-noise ratio (SNR), as set forth below in Equations (6) and (7).

$$\hat{H}(f) = \frac{\mathcal{F}[\tilde{y}](\sigma)}{\mathcal{F}[x](f)} \cdot \frac{|\mathcal{F}[x](f)|^2}{|\mathcal{F}[x](f)|^2 + 1/s(f)} \quad (6)$$

$$\hat{y}(t) = \mathcal{F}^{-1}[\hat{H}(f) \cdot \mathcal{F}[u](f)](t) \quad (7)$$

where $\hat{H}(f)$ is the regularized, estimated transfer function and $\hat{y}(t)$ is the resulting estimated ideal voltage response.

Accordingly, utilizing the processing described above can result in eliminating the contribution from non-ideal excitation on voltages measured at receivers. The processing includes emitting an excitation signal including one or more step excitations affected by an exponential decay, recording the response obtained at each receiver, and modelling or estimating the response of said receiver to an ideal excitation signal comprising one or more ideal step excitations based on the recorded response. The estimated voltage response can then be utilized via conventional and/or future-developed means for generating a borehole image log indicative of variations in individual thicknesses of the nested casing.

Figure 9:
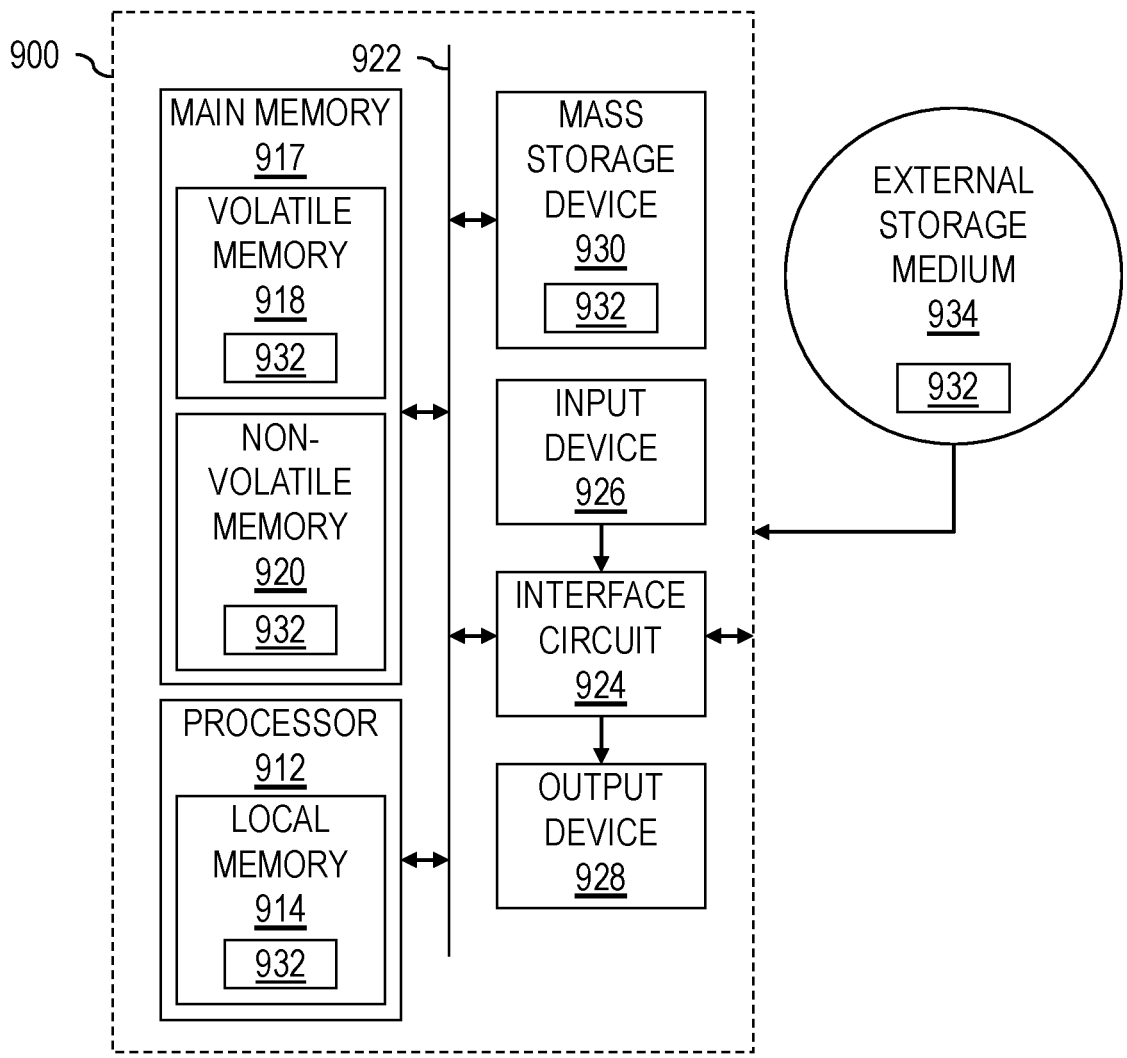
FIG. 9 is a block diagram of at least a portion of an example implementation of a processing system according to one or more aspects of the present disclosure.

FIG. 9 is a schematic view of at least a portion of an example implementation of a processing system 900 according to one or more aspects of the present disclosure. The processing system 900 may execute example machine-readable instructions to implement at least a portion of one or more of the methods and/or processes described herein, and/or to implement a portion of one or more of the example downhole tools described herein. The processing system 900 may be or comprise, for example, one or more processors, controllers, special-purpose computing devices, servers, personal computers, personal digital assistant (PDA) devices, smartphones, internet appliances, and/or other types of computing devices. The entirety of the processing system 900 may be implemented within downhole apparatus described above. One or more components or functions of the processing system 900 may also or instead be implemented in wellsite surface equipment, perhaps including the surface equipment 132 depicted in FIG. 1 and/or other surface equipment.

The processing system 900 may comprise a processor 912, such as a general-purpose programmable processor, for example. The processor 912 may comprise a local memory 914 and may execute program code instructions 932 present in the local memory 914 and/or another memory device. The processor 912 may execute, among other things, machine-readable instructions or programs to implement the methods and/or processes described herein. The programs stored in the local memory 914 may include program instructions or computer program code that, when executed by an associated processor, cause a controller and/or control system implemented in surface equipment and/or a downhole tool to perform tasks as described herein. The processor 912 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 912 may be in communication with a main memory 917, such as via a bus 922 and/or other communication means. The main memory 917 may comprise a volatile memory 918 and a non-volatile memory 920. The volatile memory 918 may be, comprise, or be implemented by random access memory (RAM), static RAM (SRAM), dynamic RAM (DRAM), synchronous DRAM memory (SDRAM), RAMBUS DRAM (RDRAM), and/or other types of RAM devices. The non-volatile memory 920 may be, comprise, or be implemented by read-only memory, flash memory, and/or other types of memory devices. One or more memory controllers (not shown) may control access to the volatile memory 918 and/or the non-volatile memory 920.

The processing system 900 may also comprise an interface circuit 924. The interface circuit 924 may be, comprise, or be implemented by various types of standard interfaces, such as an Ethernet interface, a universal serial bus (USB), a third-generation input/output (3GIO) interface, a wireless interface, and/or a cellular interface, among other examples. The interface circuit 924 may also comprise a graphics driver card. The interface circuit 924 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 926 may be connected to the interface circuit 924. One or more of the input devices 926 may permit a user to enter data and/or commands for utilization by the processor 912. Each input device 926 may be, comprise, or be implemented by a keyboard, a mouse, a touchscreen, a trackpad, a trackball, an image/code scanner, and/or a voice recognition system, among other examples.

One or more output devices 928 may also be connected to the interface circuit 924. One or more of the output devices 928 may be, comprise, or be implemented by a display device, such as a liquid crystal display (LCD), a light-emitting diode (LED) display, and/or a cathode ray tube (CRT) display, among other examples. One or more of the output devices 928 may also or instead be, comprise, or be implemented by a printer, speaker, and/or other examples.

The processing system 900 may also comprise a mass storage device 930 for storing machine-readable instructions and data. The mass storage device 930 may be connected to the interface circuit 924, such as via the bus 922. The mass storage device 930 may be or comprise a floppy disk drive, a hard disk drive, a compact disk (CD) drive, and/or digital versatile disk (DVD) drive, among other examples. The program code instructions 932 may be stored in the mass storage device 930, the volatile memory 918, the non-volatile memory 920, the local memory 914, and/or on a removable storage medium 934, such as a CD or DVD.

The mass storage device 930, the volatile memory 918, the non-volatile memory 920, the local memory 914, and/or the removable storage medium 934 may each be a tangible, non-transitory storage medium. The modules and/or other components of the processing system 900 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a system comprising a downhole logging tool and a processing system. The downhole logging tool is for being lowered into a borehole comprising a plurality of nested casing tubulars surrounding the logging tool in the borehole. The downhole logging tool comprises: a transmitter coil operable for emitting a broadband excitation signal including one or more step excitations; a plurality of receiver coils comprising at least two receiver coils spaced apart from the transmitter coil at respective first and second distances from the transmitter, wherein the first and second distances are distinct from each other, and wherein each receiver coil is configured to receive a response signal resulting from the excitation signal; and an acquisition system for recording the excitation signal and the response signal of each receiver coil over time. The processing system is for deriving information indicative of variations in individual thicknesses of the nested casing tubulars based on variations of the response signals over time.

The plurality of receiver coils may comprise: a first receiver coil spaced apart from the transmitter coil by the first distance; a second receiver coil spaced apart from the transmitter coil by the second distance; and a third receiver coil spaced apart from the transmitter coil by a third distance distinct from the first and second distances.

The plurality of receiver coils may comprise a collocated receiver coil collocated with the transmitter coil.

The transmitter coil and a closest one of the receiver coils that is not collocated with the transmitter coil may be spaced apart by less than about 40 centimeters.

The transmitter coil and one of the receiver coils may be spaced apart by more than about 150 centimeters.

The excitation signal may comprise a sequence of two or more step excitations.

The acquisition system may be configured to acquire at least a voltage response of each receiver coil, and each acquired voltage response may be induced by the excitation signal emitted by the transmitter coil.

The excitation signal may comprise at least one step excitation defined by Equation (2B) set forth above.

The downhole logging tool may comprise the processing system.

The processing system may be disposed at a wellsite surface from whence the borehole extends, and the downhole logging tool may be in communication with the processing system when the downhole logging tool is disposed in the borehole.

The processing system may be configured to estimate an ideal response of each receiver coil to an ideal excitation signal based on the recorded response signals.

The processing system may be configured to determine a transfer function of each receiver coil based on: a Fourier transform of the response signal recorded for that receiver coil; and a Fourier transform of the recorded excitation signal. Determining the transfer function of each receiver coil may utilize Equation (4) set forth above. The processing system may be configured to estimate an ideal response of each receiver coil to an ideal excitation signal based on an inverse Fourier transform of: the transfer function determined for that receiver coil; and a Fourier transform of the ideal excitation signal. Estimating the ideal response of each receiver coil may utilize Equation (5) set forth above. The transfer function determination for each receiver coil may be further based on a spectral density of an SNR of the response signal recorded for that receiver coil.

The processing system may be configured to estimate a transfer function of each receiver coil based on Equation (6) set forth above. The processing system may be configured to estimate an ideal response of each receiver coil to an ideal excitation signal based on Equation (7) set forth above.

The present disclosure also introduces a method comprising operating a downhole logging tool lowered into a borehole comprising a plurality of nested casing tubulars surrounding the logging tool in the borehole, wherein operating the downhole logging tool comprises: emitting, via a transmitter coil of the downhole logging tool, a broadband excitation signal including one or more step excitations; and recording, via an acquisition system of the downhole logging tool, the excitation signal and a response signal of each of a plurality of receiver coils of the downhole logging tool resulting from the excitation signal, wherein the plurality of receiver coils comprises at least two receiver coils spaced apart from the transmitter coil at respective first and second distances from the transmitter, and wherein the first and second distances are distinct from each other. The method also comprises operating a processing system to derive information indicative of variations in individual thicknesses of the nested casing tubulars based on variations of the response signals over time.

The plurality of receiver coils may comprise: a first receiver coil spaced apart from the transmitter coil by the first distance; a second receiver coil spaced apart from the transmitter coil by the second distance; and a third receiver coil spaced apart from the transmitter coil by a third distance distinct from the first and second distances.

The plurality of receiver coils may comprise a collocated receiver coil collocated with the transmitter coil.

The transmitter coil and a closest one of the receiver coils that is not collocated with the transmitter coil may be spaced apart by less than about 40 centimeters.

The transmitter coil and one of the receiver coils may be spaced apart by more than about 150 centimeters.

The step excitation signal may comprise a sequence of two or more step excitations.

The step excitation signal may comprise at least one step excitation defined by Equation (2B) set forth above.

The downhole logging tool may comprise the processing system.

The processing system may be disposed at a wellsite surface from whence the borehole extends, and the downhole logging tool may be in communication with the processing system when the downhole logging tool is disposed in the borehole.

The method may comprise operating the processing system to estimate an ideal response of each receiver coil to an ideal excitation signal based on the recorded response signals.

The method may comprise operating the processing system to determine a transfer function of each receiver coil based on: a Fourier transform of the response signal recorded for that receiver coil; and a Fourier transform of the recorded excitation signal. Determining the transfer function of each receiver coil may utilize Equation (4) set forth above. The method may further comprise operating the processing system to estimate an ideal response of each receiver coil to an ideal excitation signal based on an inverse Fourier transform of: the transfer function determined for that receiver coil; and a Fourier transform of the ideal excitation signal. Estimating the ideal response of each receiver coil may utilize Equation (5) set forth above. The transfer function determination for each receiver coil may be further based on a spectral density of an SNR of the response signal recorded for that receiver coil.

The method may comprise operating the processing system to estimate a transfer function of each receiver coil based on Equation (6) set forth above. The method may further comprise operating the processing system to estimate an ideal response of each receiver coil to an ideal excitation signal based on Equation (7) set forth above.

The present disclosure also introduces a method comprising: (A) acquiring an actual excitation signal emitted by a transmitter of a transmitter-receiver system of a logging tool while the logging tool is disposed within a borehole extending into a subterranean formation, wherein the actual excitation signal is emitted by the transmitter; (B) acquiring a voltage response of a receiver of the transmitter-receiver system while the logging tool is disposed within the borehole, wherein the acquired voltage response is induced by the actual excitation signal emitted by the transmitter; (C) determining a transfer function of the transmitter-receiver system based on: (i) a Fourier transform of the acquired voltage response; (ii) a Fourier transform of the acquired actual excitation signal; and (iii) a spectral density of an SNR of the acquired voltage response; and (D) estimating an ideal voltage response of the receiver to the ideal excitation signal as an inverse Fourier transform of: (i) the transfer function of the determined transmitter-receiver system; and (ii) a Fourier transform of the ideal excitation signal.

The method may comprise generating a borehole image log based on the estimated ideal voltage response. The borehole image log may be indicative of variations in individual thicknesses of a plurality of nested casing tubulars surrounding the logging tool in the borehole.

Determining the transfer function may utilize Equation (6) set forth above. Estimating the ideal voltage response may utilize Equation (7) set forth above.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A system comprising:
   a downhole logging tool for being lowered into a borehole comprising a plurality of nested casing tubulars surrounding the downhole logging tool in the borehole, wherein the downhole logging tool comprises:
      a transmitter coil operable for emitting an actual broadband excitation signal based on an input of an ideal broadband excitation signal, wherein the ideal broadband excitation signal is defined as a stepwise square-wave voltage signal and the actual broadband excitation signal includes the stepwise square-wave voltage signal affected by an exponential decay;
      a plurality of receiver coils spaced apart from the transmitter coil at predetermined distances from the transmitter coil, wherein each receiver coil is configured to receive an actual response signal resulting from the actual broadband excitation signal propagating through one or more nested casing tubulars of the plurality of nested casing tubulars, the actual response signal for each receiver coil including a response voltage having a contribution resulting from the exponential decay; and
   an acquisition system for recording over time the ideal broadband excitation signal input to the transmitter coil, the actual broadband excitation signal emitted from the transmitter coil, and the actual response signal for each receiver coil; and
   a processing system configured to:
      determine, for each receiver coil, a transfer function based on the actual broadband excitation signal emitted by the transmitter coil and the actual response signal of that receiver coil;
      estimate an ideal response signal for each receiver coil, including:
         applying the transfer function for that receiver coil to the ideal broadband excitation signal; and
         based on applying the transfer function, removing the contribution of the exponential decay from the response voltage for that receiver coil, wherein the ideal response signal is a stepwise square-wave response voltage unaffected by the exponential decay, that would result from the transmitter coil emitting the ideal broadband excitation signal; and
      determine an individual thickness of each nested casing tubular of the plurality of nested casing tubulars based on differences among the estimated ideal response signals for the plurality of receiver coils over time.

2. The system of claim 1 wherein the plurality of receiver coils comprises:
   a first receiver coil spaced apart from the transmitter coil by a first distance;
   a second receiver coil spaced apart from the transmitter coil by a second distance that is greater than the first distance; and
   a third receiver coil spaced apart from the transmitter coil by a third distance that is greater than the second distance.

3. The system of claim 2, wherein the second receiver coil is larger than the first receiver coil and the third receiver coil is larger than the second receiver coil.

4. The system of claim 1 wherein the plurality of receiver coils comprises a receiver coil collocated with the transmitter coil for detecting the actual broadband excitation signal emitted by the transmitter coil.

5. The system of claim 1, wherein the transmitter coil and a closest receiver coil of the plurality of receiver coils that is not collocated with the transmitter coil are spaced apart by less than forty centimeters.

6. The system of claim 1 wherein the transmitter coil and a receiver coil of the plurality of receiver coils are spaced apart by more than 150 centimeters.

7. The system of claim 1 wherein the ideal broadband excitation signal comprises a sequence of two or more step excitations.

8. The system of claim 1 wherein the actual broadband excitation signal comprises at least one step excitation defined by x(t), wherein $$x(t) = \Sigma_{i=1}^{N} A_i e^{\beta_i \cdot t} \text{ with } \beta_i < 0, i \geq 1, \text{ and } t > 0,$$

where:
   x(t) is a decaying transmitter signal relative to time,
   i is a component of a current signal of the transmitter coil,
   $A_i$ is an amplitude of component i,
   $\beta_i$ is a decay rate of component i, and
   t is time.

9. The system of claim 1 wherein the processing system is configured to determine the transfer function for each receiver coil based on:
   a Fourier transform of the actual response signal recorded for the receiver coil; and
   a Fourier transform of the actual broadband excitation signal.

10. The system of claim 9 wherein determining the transfer function for each receiver coil utilizes the Equation:

$$H(f) = \frac{\mathcal{F}[\tilde{y}](f)}{\mathcal{F}[x](f)}$$

where:
- H(f) is the transfer function determined for the receiver coil,
- $\mathcal{F}[\tilde{y}](f)$ is the Fourier transform of the actual response signal recorded for the receiver coil, and
- $\mathcal{F}[x](f)$ is the Fourier transform of the actual broadband excitation signal.

11. The system of claim 10 wherein the processing system is configured to estimate the ideal response signal for each receiver coil of the plurality of receiver coils based on an inverse Fourier transform of:
- the transfer function determined for the receiver coil; and
- a Fourier transform of the ideal broadband excitation signal.

12. The system of claim 11 wherein estimating the ideal response signal for each receiver coil utilizes the Equation:

$$y(t) = \mathcal{F}^{-1}[H(f) \cdot \mathcal{F}[u](f)](t)$$

where:
- y(t) is the stepwise square-wave response voltage unaffected by the exponential decay that would result from the transmitter coil emitting the ideal broadband excitation signal,
- H(f) is the transfer function determined for the receiver coil,
- $\mathcal{F}[u](f)$ is the Fourier transform of the ideal broadband excitation signal, and
- $\mathcal{F}^{-} \mathcal{F}^{-1}$ is the notation for the inverse Fourier transform.

13. The system according to claim 9, wherein determining the transfer function for each receiver coil is further based on a spectral density of a signal-to-noise ratio of the actual response signal recorded for the receiver coil.

14. The system according to claim 9, wherein the processing system is included in the downhole logging tool.

15. The system according to claim 1, wherein the processing system is disposed at a wellsite surface from whence the borehole extends, and is in communication with the downhole logging tool when the downhole logging tool is disposed in the borehole.

16. The system of claim 1, wherein each receiver coil of the plurality of receiver coils is respectively sized such that each receiver coil is larger than the receiver coils whose distinct distances are less than that of the receiver coil.

17. A method comprising:
- operating a downhole logging tool lowered into a borehole, the borehole comprising a plurality of nested casing tubulars surrounding the downhole logging tool in the borehole, wherein operating the downhole logging tool comprises:
  - inputting, at a transmitter coil of the downhole logging tool, an ideal broadband excitation signal defined as a stepwise square-wave voltage signal
  - based on the ideal broadband excitation signal, emitting, via the transmitter coil, an actual broadband excitation signal that includes the stepwise square-wave voltage signal affected by an exponential decay;
  - recording, via an acquisition system of the downhole logging tool, the ideal broadband excitation signal input to the transmitter coil, the actual broadband excitation signal emitted by the transmitter coil, and an actual response signal for each of a plurality of receiver coils of the downhole logging tool, the actual response signal resulting from the actual broadband excitation signal propagating through one or more nested casing tubulars of the plurality of nested casing tubulars, the actual response signal including a response voltage having a contribution resulting from the exponential decay, wherein the plurality of receiver coils are spaced apart from the transmitter coil at predetermined distances from the transmitter coil; and
- operating a processing system to:
  - determine, for each receiver coil, a transfer function for each receiver coil based on the actual broadband excitation signal emitted by the transmitter coil and the actual response signal of that receiver coil;
  - estimate an ideal response signal for each receiver coil, including:
    - applying the transfer function for that receiver coil to the ideal broadband excitation signal; and
    - based on applying the transfer function, removing the contribution of the exponential decay from the response voltage for that receiver coil, wherein the ideal response signal is a stepwise square-wave response voltage unaffected by the exponential decay, that would result from the transmitter coil emitting the ideal broadband excitation signal; and
  - determine an individual thickness of each nested casing tubular of the plurality of nested casing tubulars based on differences among the estimated ideal response signal for each of the plurality of receiver coils over time.

18. The method of claim 17 further comprising operating the processing system to determine the transfer function for each receiver coil based on:
- a Fourier transform of the actual response signal recorded for the receiver coil; and
- a Fourier transform of the actual broadband excitation signal.

19. The method according to claim 18, wherein determining the transfer function for each receiver coil utilizes the Equation:

$$H(f) = \frac{\mathcal{F}[\tilde{y}](f)}{\mathcal{F}[x](f)}$$

where:
- H(f) is the transfer function determined for the receiver coil,
- $\mathcal{F}[\tilde{y}](f)$ is the Fourier transform of the actual response signal recorded for the receiver coil, and
- $\mathcal{F}[x](f)$ is the Fourier transform of the actual broadband excitation signal.

20. The method according to claim 19, wherein estimating the ideal response signal for each receiver coil of the plurality of receiver coils is based on an inverse Fourier transform of:
- the transfer function determined for the receiver coil; and
- a Fourier transform of the ideal broadband excitation signal.

* * * * *